Aug. 9, 1932.  1,870,761
SERGE VINCENT CONSTANTINOVITCH, PRINCE WIASEMSKY
MOTOR UNIT FOR BICYCLES, TRICYCLES, AND THE LIKE
Filed Oct. 12, 1929   3 Sheets-Sheet 2
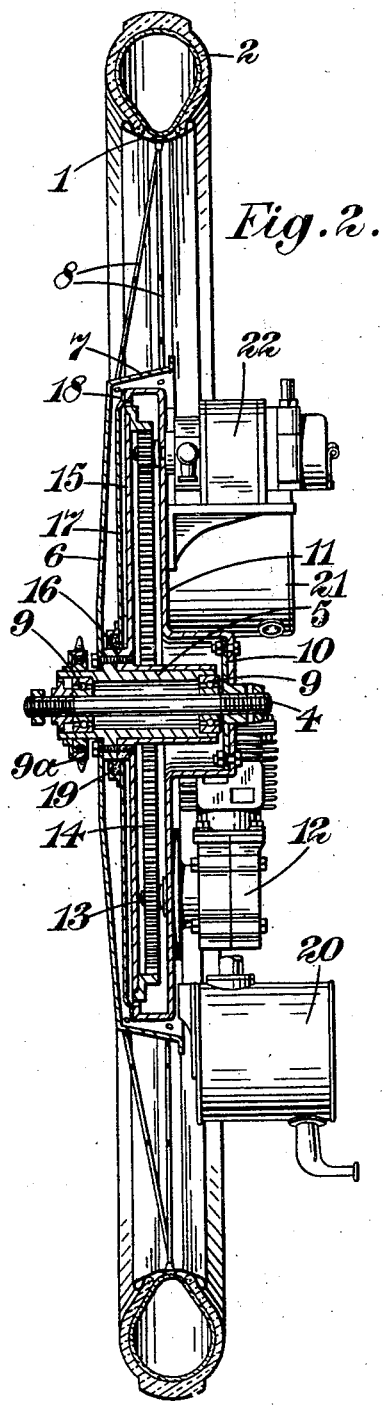
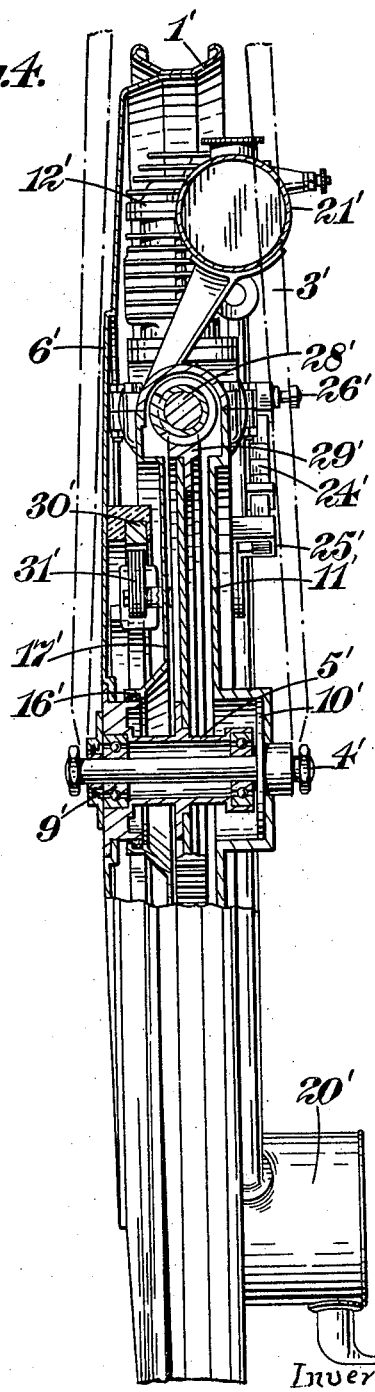
Inventor.
SERGE VINCENT CONSTANTINOVITCH PRINCE WIASEMSKY.

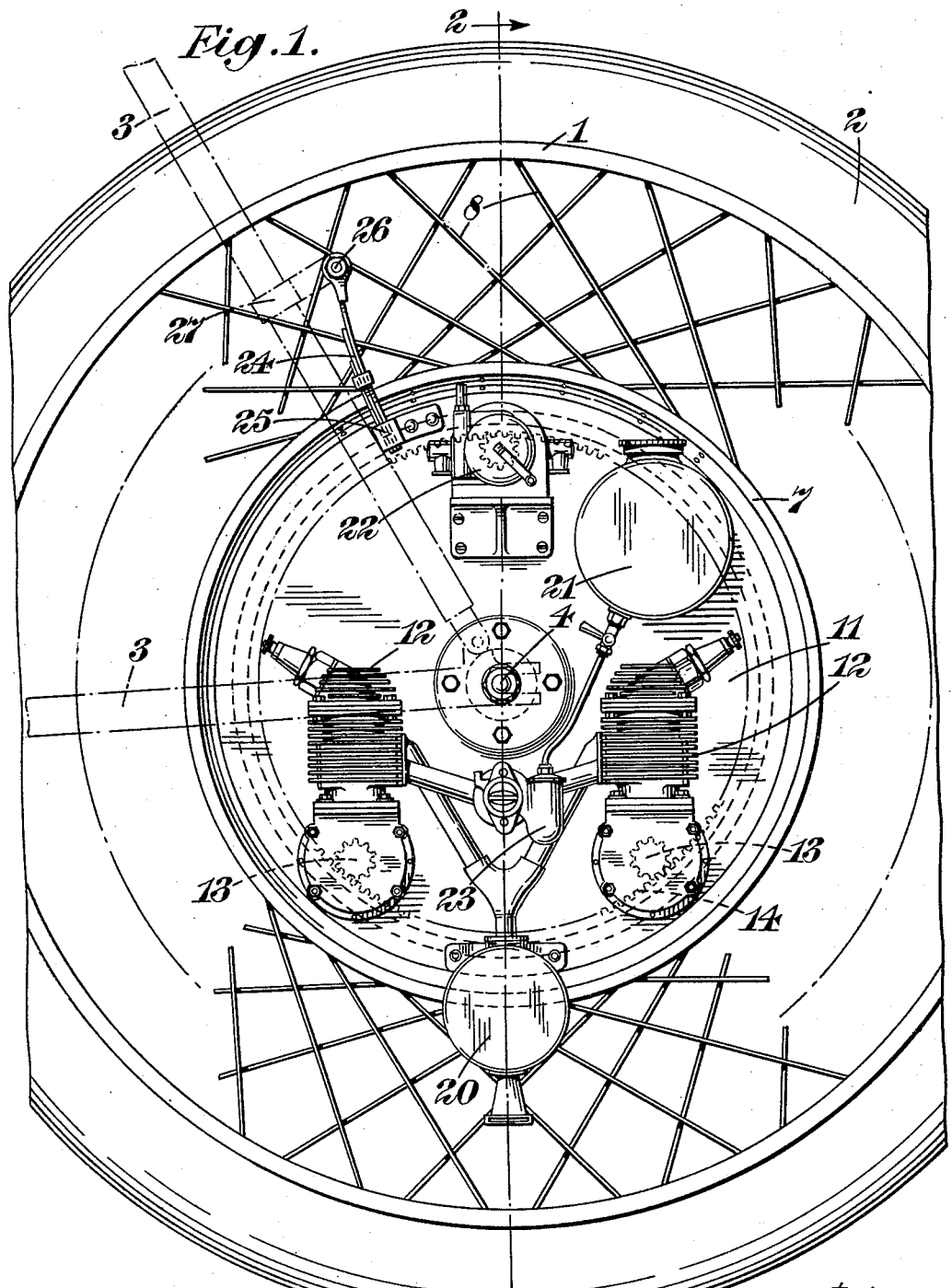

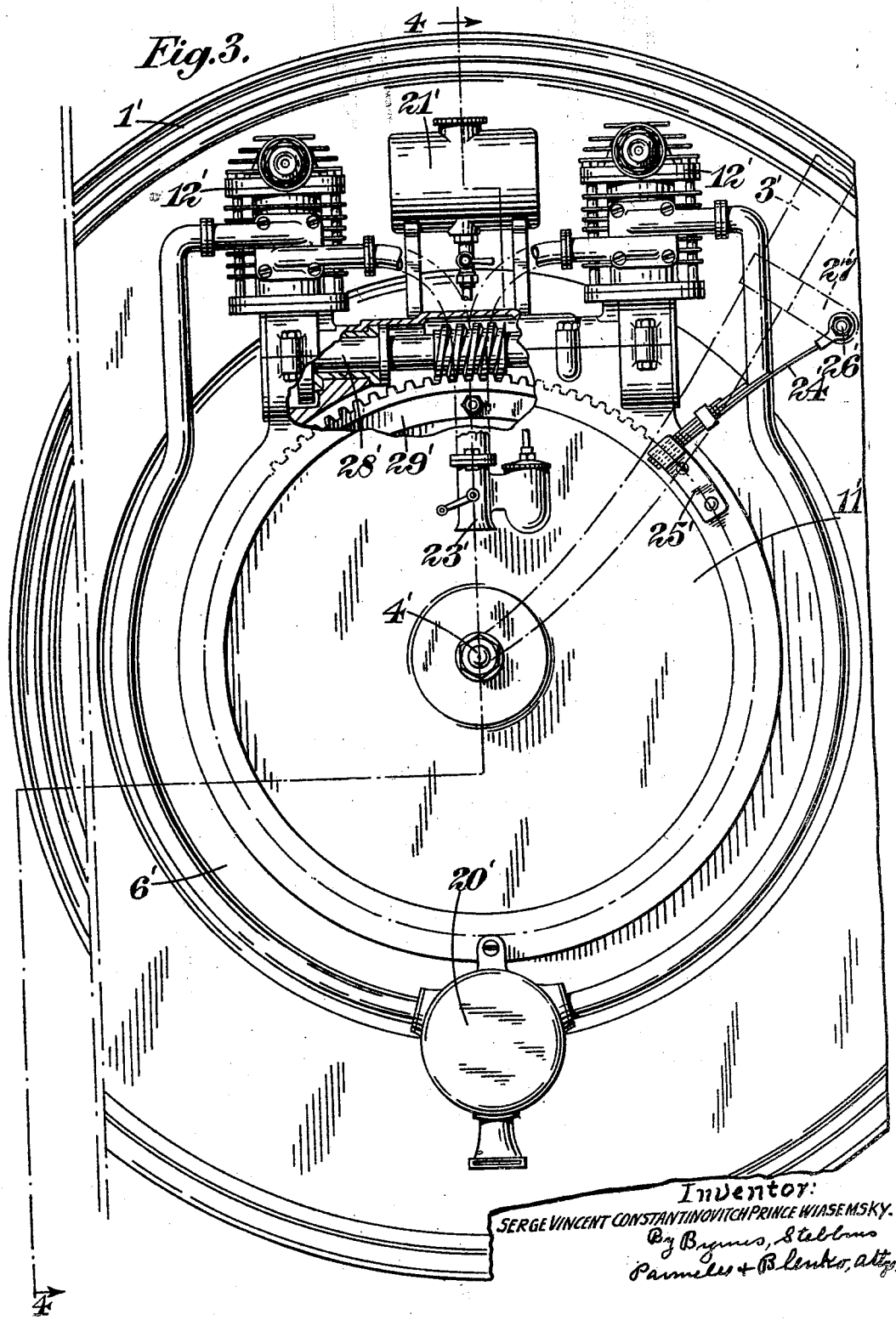

Patented Aug. 9, 1932

1,870,761

UNITED STATES PATENT OFFICE

SERGE VINCENT CONSTANTINOVITCH, PRINCE WIASEMSKY, OF LONDON, ENGLAND

MOTOR UNIT FOR BICYCLES, TRICYCLES, AND THE LIKE

Application filed October 12, 1929, Serial No. 399,313, and in Great Britain October 20, 1928.

This invention relates to bicycles, tricycles and other rider-propelled road vehicles of the kind in which a road-wheel is mounted in forks.

Power-unit attachments have been proposed for road vehicles of this kind by which such vehicles can be promptly and cheaply converted into motor-propelled vehicles when desired. The power-unit attachment takes the form of a road-wheel supporting an engine operatively connected to it, which road-wheel is so constructed as to be adapted for substitution for one of the ordinary road-wheels of the vehicle in the forks ordinarily occupied by that road-wheel. In one known form of power-unit attachment of this general description, the axle upon which the wheel of the unit is mounted when in position in the vehicle, occupies the position previously occupied by the axle of the ordinary road-wheel and the construction of the unit is such that the unit can be fixed in place in the vehicle by simply inserting it within the forks thereof and securing the axle. The present invention has reference to this particular type of power-unit attachment and has for its object to provide an improved construction of unit.

According to the present invention, a power-unit attachment of the type referred to comprises an engine geared to the road-wheel through the medium of a worm-shaft driven by the engine (for example by cylinders at opposite ends of said worm-shaft) in combination with a cooperating worm-wheel concentric with and fixed to the road-wheel of the unit.

The invention further includes, in a power-unit attachment of the type referred to, an internally-toothed ring fixed to its road-wheel in combination with a plurality of engines (for example vertical engines) each engine geared to the said internally-toothed ring by a spur pinion on the end of its crank-shaft.

According to a feature of the invention, the plurality of engines may be set in part in front of and in part in rear of the axis of rotation of the toothed ring.

According to a further feature of the invention, the unit may comprise an engine-supporting frame which constitutes or supports an oil-retaining drum enclosing the driving-pinions and toothed annulus or worm-shaft and worm-wheel by which the engine is geared to the road-wheel.

The engines may be permanently geared to the road-wheel. It is to be understood, however, that whilst for the sake of simplicity and the avoidance of the necessity for skilled labour in fitting the attachment to the bicycle or other road-vehicle, the preferred construction is one in which the engine of the unit is permanently geared to the road-wheel, the invention is not limited to a construction of this character and, if desired, the engine may be operatively connected to the road-wheel through the medium of a clutch. For example, the toothed annulus may, if desired, be connected to the road-wheel through a clutch control from the handlebars of the bicycle by means of a Bowden or other suitable control.

According to yet a further feature of the invention, the engines may be geared to the annulus by means of a worm shaft driven by the engines and meshing with the annulus which is a worm-wheel.

The invention further comprises a power-unit attachment characterized by any one or more of the features set forth above and wherein the engine and its silencer, magneto, carburettor and other appurtenances, are carried upon a stationary supporting frame which is itself supported upon the axle of the unit.

The invention may take various forms. Two embodiments, however, will now be described, by way of example, with reference to the accompanying drawings, of which—

Figure 1 is an elevation of one form of power-unit attachment according to the invention for use in place of the ordinary rear-wheel of a pedal bicycle.

Figure 2 is a vertical transverse section through the attachment along the line 2—2 of Figure 1, looking in the direction of the arrows.

Figure 3 is a side elevation of power-unit attachment according to the invention, for use in place of the ordinary front wheel of a pedal bicycle, and Figure 4 is partly a vertical transverse cross-section through the attachment shown in Figure 3, and partly an external end view, taken along the line 4—4 of Figure 3 and looking in the direction of the arrows.

Referring first to Figures 1 and 2, the unit comprises a road-wheel rim 1 carrying a pneumatic tyre 2. The attachment is arranged to be inserted in the rear forks 3 of a pedal bicycle in the place of the ordinary chain-driven road-wheel thereof. Mounted in the foot of the forks 3, in the place occupied by the axle of the ordinary road-wheel of the vehicle is a fixed axle 4. The axle 4 supports the attachment in the forks 3.

Mounted upon the fixed axle 4 is a wheel hub 5, to one end of which is secured a dished disc 6 forming a part of the road-wheel. The rim 1 of the road-wheel is connected to the annular wall 7 of the disc 6 by wire spokes 8. The rim 1, the tyre upon it 2, the spokes 8, the disc 6 and the hub 5 comprise together the wheel of the attachment and the hub 5 is mounted upon the axle 4 through the medium of ball bearings 9.

Mounted upon the left-hand end of the hub 5 is a free-wheel sprocket 9a adapted to receive the ordinary driving chain of the bicycle so that the rider can start the power-unit by pedalling along the road a short distance. If desired, however, the free-wheel sprocket may be omitted.

Also mounted upon the axle 4 is a stationary disc-shaped bracket 10 to which is bolted a drum-shaped supporting frame 11 for the engine and its appurtenances. This frame is, of course, stationary along with the bracket 10 and carries upon its face two small petrol engines 12 permanently geared to the road-wheel through the medium of pinions 13 on the crankshaft of the engine meshing with a rotating toothed annulus 14. The annulus 14 is fixed around the edge of a circular plate 15 bolted near the centre to an annular shoulder 16 projecting from the periphery of one end of the hub 5. The plate 15 rotates with the hub 5 and, therefore, with the road-wheel as a whole and transmits the drive from the engines to the hub 5.

The frame 11 constitutes one half of a dust-excluding and oil-retaining drum enclosing the pinions 13 and rotating annulus 14. The other half of the drum is constituted by a cover-plate 17 secured around its outer edge 18 to the edge of the frame 11 and carrying around its inner edge a packing gland 19, packing the clearance between the inner edge of the stationary plate 17 and the periphery of the rotating hub 5.

The frame 11 carries, in addition to the engines 12, the silencer of the engine 20, a petrol tank 21, the magneto of the engine 22 and the carburettor 23. For the sake of clearness of illustration the carburettor and its connections to the engine and the petrol tank are not shown in Figure 2.

Mounted also upon the frame 11 is a torque member 24 in the form of a cantilever type leaf-spring attached by a bracket 25 to the face of the frame 11 and pivoted at 26 to a bracket 27 clipped to the fork 3. As previously explained, herein, the axle connection of the unit with the vehicle framework constitutes the principal connection between the attachment of the invention and the framework of the vehicle to which the attachment is applied, and this resilient torque member 24 performs the function of transmitting some of the driving torque from the engine-supporting frame 11 to the framework of the vehicle, and thereby relieves the axle connection from some of the stress which it would otherwise need to resist.

Referring next to the construction shown in Figures 3 and 4. In this construction, instead of the engine 12' being geared to the road-wheel through the medium of pinions on the engine shafts and a toothed annulus on the road-wheel hub, the engines are directly geared to the wheel through the medium of a worm-shaft 28' and a co-operating worm-wheel 29', the latter being mounted upon the rotatable road-wheel hub 5'. This is the principal distinction between the two constructions. The worm-shaft 28 and worm-wheel 29' are enclosed within a dust-excluding and oil-retaining drum as in the case of the other construction. One half of the drum is constituted by a stationary engine-supporting frame 11' bolted to a stationary disc-shaped bracket 10' carried in turn upon the fixed road-wheel axle 4'. The other half of the drum, as in the former construction, is constituted by a stationary plate 17' carrying a packing gland 16' packing the clearance between said plate and the rotating hub 5' of the wheel.

A further difference from the construction shown in Figures 1 and 2 is in respect of the magneto. In the construction shown in Figures 3 and 4, the magneto is of the type comprising a rotating series of permanent magnets 30' arranged in a circle concentrically around the wheel axis of the unit and a co-operating stationary pair of wound soft iron magnets 31'. The permanent magnets 30' are carried upon the wheel disc 6' and rotate with it. The magnets 31' are carried upon the plate 17' and are stationary with that plate.

Various modifications are possible: Thus, the arrangement may, if desired, be one in which the axle by which the unit is carried in the forks of the vehicle is the axle of the replaced ordinary road-wheel. For this purpose, the hub 5' and the bearings 9 would be adapted to receive within them and be carried by the axle of the replaced wheel.

I claim:—

1. Means for converting pedal-operated road-vehicles in which a road wheel is mounted in forks, into motor-propelled vehicles, comprising a self-contained power-unit attachment comprising an axle mountable in the forks of the vehicle in place of the ordinary road wheel therein, a road wheel mounted upon said axle, two engines each having its own engine shaft, a silencer, magneto and carburetor for the two engines, a stationary supporting frame carrying the engines and said silencer, magneto and carburetor, which supporting-frame is mounted upon said axle, an internally toothed annulus concentric with, carried upon and fixed to said road wheel and spur pinions on the engine shafts meshing directly each with the teeth of the annulus, the engines being thereby permanently in gear with the road wheel.

2. Means for converting pedal-operated road-vehicles in which a road wheel is mounted in forks, into motor-propelled vehicles, comprising a self-contained power-unit attachment comprising an axle mountable in the forks of the vehicle in place of the ordinary road wheel therein, a road wheel mounted upon said axle, two engines having each their own engine shaft and having a silencer, magneto and carburetor, the engines being disposed symmetrically in the unit one forward of the axis of the road wheel and the other in rear thereof, a stationary supporting frame mounted upon said axle and carrying the engines, silencer, magneto and carburetor, an internally toothed annulus concentric with, carried upon and fixed to said road wheel and spur pinions on the engine shafts meshing directly each with the teeth of the annulus, the engines being thereby permanently in gear with the road wheel.

3. A self-contained power-unit attachment according to claim 2, wherein the stationary supporting-frame comprises a hollow dust-excluding and oil-retaining drum enclosing the gearing by which the engines are geared to the road wheel.

4. A self contained power-unit attachment insertable in the forks of a pedal-operated road vehicle in which a road wheel is mounted in forks, in place of said road wheel, for converting the vehicle into a motor propelled vehicle, which attachment comprises a stationary spindle mountable in the forks of the vehicle in place of the ordinary road wheel therein, a road wheel hub rotatable thereon, a road wheel rim concentric with said hub, means connecting the rim to the hub, said hub, rim and connecting means constituting together a road wheel, a toothed annulus concentric with the road wheel hub and fixed thereto so as to be rotatable with it, a substantially flat oil-retaining casing lying in the general plane of the road wheel and enclosing the toothed annulus, which casing is mounted upon the said spindle so as to be stationary therewith, and together with the road wheel is accommodable between the forks of the vehicle, a petrol engine mounted upon the said casing exteriorly thereto, and means permanently gearing the engine to the toothed annulus.

5. A self contained power-unit attachment insertable in the forks of a pedal-operated road vehicle in which a road wheel is mounted in forks, in place of said road wheel, for converting the vehicle into a motor propelled vehicle, which attachment comprises a stationary spindle mountable in the forks of the vehicle in place of the ordinary road wheel therein, a road wheel hub rotatable thereon, a road wheel rim concentric with said hub, means connecting the rim to one end of the hub, said hub, rim and connecting means constituting together a road wheel, a toothed annulus concentric with the road wheel hub and fixed thereto so as to be rotatable with it, a discoidal oil-retaining casing lying in the general plane of the road wheel and enclosing the toothed annulus, which casing at one side is mounted upon the said spindle at the end thereof remote from the end adjacent to that end of the hub to which the rim is connected by said connecting means, and at the other side extends inwardly from the periphery of the casing to a point adjacent the periphery of the hub, the casing being stationary with the spindle and together with the road wheel accommodable between the forks of the vehicle, packing means between said periphery of the hub and the casing, a petrol engine mounted upon the said casing exteriorly thereto, and means permanently gearing the engine to the toothed annulus.

6. A self contained power-unit attachment insertable in the forks of a pedal-operated road vehicle in which a road wheel is mounted in forks, in place of said road wheel, for converting the vehicle into a motor propelled vehicle, which attachment comprises a stationary spindle mountable in the forks of the vehicle in place of the ordinary road wheel therein, a road wheel hub rotatable thereon, a road wheel rim concentric with said hub, means connecting the rim to the hub, said hub, rim and connecting means constituting together a road wheel, a toothed annulus concentric with the road wheel hub and fixed thereto so as to be rotatable with it, a substantially flat oil retaining casing lying in the general plane of the road wheel and enclosing the toothed annulus, which casing is mounted upon the said spindle so as to be stationary therewith, and together with the road wheel is accommodable between the forks of the vehicle, a petrol engine mounted upon the said casing exteriorly thereto, means permanently gearing the engine to the toothed annulus, a silencer, a magneto and a carburetor for the engine, which silencer, magneto and carburetor are also mounted upon the exterior of the said casing.

7. A self contained power-unit attachment insertable in the forks of a pedal-operated road vehicle in which a road wheel is mounted in forks, in place of said road wheel, for converting the vehicle into a motor propelled vehicle, which attachment comprises a stationary spindle mountable in the forks of the vehicle in place of the ordinary road wheel therein, a road wheel hub rotatable thereon, a road wheel rim concentric with said hub, means connecting the rim to the hub, said hub, rim and connecting means constituting together a road wheel, a worm wheel so positioned as to lie substantially in the medial plane of the road wheel and fixed to the hub so as to be rotatable therewith, two engines accommodated between the worm-wheel and the rim of the road wheel with their cylinder axes vertical and lying substantially in said medial plane and spaced apart symmetrically one forward of the axis of the road wheel and the other in rear thereof, a horizontal engine shaft common to the two engines also lying substantially in said medial plane, a single worm fast upon said shaft and meshing with the worm wheel, a substantially flat oil retaining casing lying in the general plane of the road wheel and enclosing the worm-wheel, which casing is mounted upon the said spindle so as to be stationary therewith, and together with the road wheel is accommodable between the forks of the vehicle, a silencer, a magneto and a carburettor for the engines, which silencer, magneto and carburettor are mounted upon the exterior of the said casing.

In testimony whereof I affix my signature.

SERGE VINCENT CONSTANTINOVITCH,
PRINCE WIASEMSKY.